(12) United States Patent
Lau et al.

(10) Patent No.: US 9,709,437 B2
(45) Date of Patent: Jul. 18, 2017

(54) SYSTEM AND METHOD FOR DETECTING A DEFECT IN A STRUCTURE MEMBER

(71) Applicant: City University of Hong Kong, Kowloon (HK)

(72) Inventors: Denvid Lau, Kowloon (HK); Tin Kei Cheng, Kowloon (HK)

(73) Assignee: City University of Hong Kong, Hong Kong (HK)

( * ) Notice: Subject to any disclaimer, the term of this patent is extended or adjusted under 35 U.S.C. 154(b) by 87 days.

(21) Appl. No.: 14/624,728

(22) Filed: Feb. 18, 2015

(65) Prior Publication Data

US 2016/0238534 A1 Aug. 18, 2016

(51) Int. Cl.
*G01N 21/00* (2006.01)
*G01H 9/00* (2006.01)

(52) U.S. Cl.
CPC .................... *G01H 9/002* (2013.01)

(58) Field of Classification Search
CPC ....................................................... G01N 21/00
USPC ....................................................... 356/237.2
See application file for complete search history.

(56) References Cited

U.S. PATENT DOCUMENTS

| | | | | |
|---|---|---|---|---|
| 4,211,488 A | * | 7/1980 | Kleinknecht | G01R 31/2656 250/559.16 |
| 4,652,757 A | * | 3/1987 | Carver | G01N 21/1717 250/338.1 |
| 4,750,822 A | * | 6/1988 | Rosencwaig | G01N 21/17 356/432 |
| 4,850,712 A | * | 7/1989 | Abshire | B23Q 35/128 250/205 |
| 5,042,952 A | * | 8/1991 | Opsal | G01R 31/2656 356/432 |
| 5,657,754 A | * | 8/1997 | Rosencwaig | A61B 5/14532 600/316 |
| 6,268,916 B1 | * | 7/2001 | Lee | G01B 11/065 356/369 |
| 6,728,596 B1 | * | 4/2004 | Lindseth | H01L 21/681 382/151 |
| 6,806,951 B2 | * | 10/2004 | Wack | G01N 21/211 257/E21.53 |
| 6,888,632 B2 | * | 5/2005 | Smith | G01N 21/4788 356/369 |
| 7,009,695 B2 | * | 3/2006 | Some | G01N 25/72 356/237.1 |
| 7,400,402 B2 | * | 7/2008 | Smith | G01N 21/4788 356/237.2 |
| 7,502,104 B2 | * | 3/2009 | Salnik | G01N 21/1717 356/237.2 |
| 7,705,977 B2 | * | 4/2010 | Salnik | G01N 21/1717 356/237.2 |

(Continued)

FOREIGN PATENT DOCUMENTS

EP 0211590 A2 * 2/1987 ......... G01N 21/1717

*Primary Examiner* — Roy M Punnoose
(74) *Attorney, Agent, or Firm* — Renner Kenner Greive Bobak Taylor & Weber

(57) ABSTRACT

A method for detecting a defect in a structure member includes exciting a structure member by applying an excitation signal to the structure member, applying an optical signal to the excited structure member and capturing a reflected optical signal formed by a reflection of the applied optical signal by the excited structure member, and processing the reflected optical signal to determine one or more defects in the structure member.

27 Claims, 12 Drawing Sheets

(56) References Cited

U.S. PATENT DOCUMENTS

| | | | | |
|---|---|---|---|---|
| 2002/0018210 | A1* | 2/2002 | Maris | G01B 11/02 |
| | | | | 356/432 |
| 2004/0196453 | A1* | 10/2004 | Some | G01N 25/72 |
| | | | | 356/237.1 |
| 2010/0271621 | A1* | 10/2010 | Levy | G01N 21/211 |
| | | | | 356/73 |
| 2011/0245637 | A1* | 10/2011 | McKenna | A61B 5/14552 |
| | | | | 600/310 |

* cited by examiner

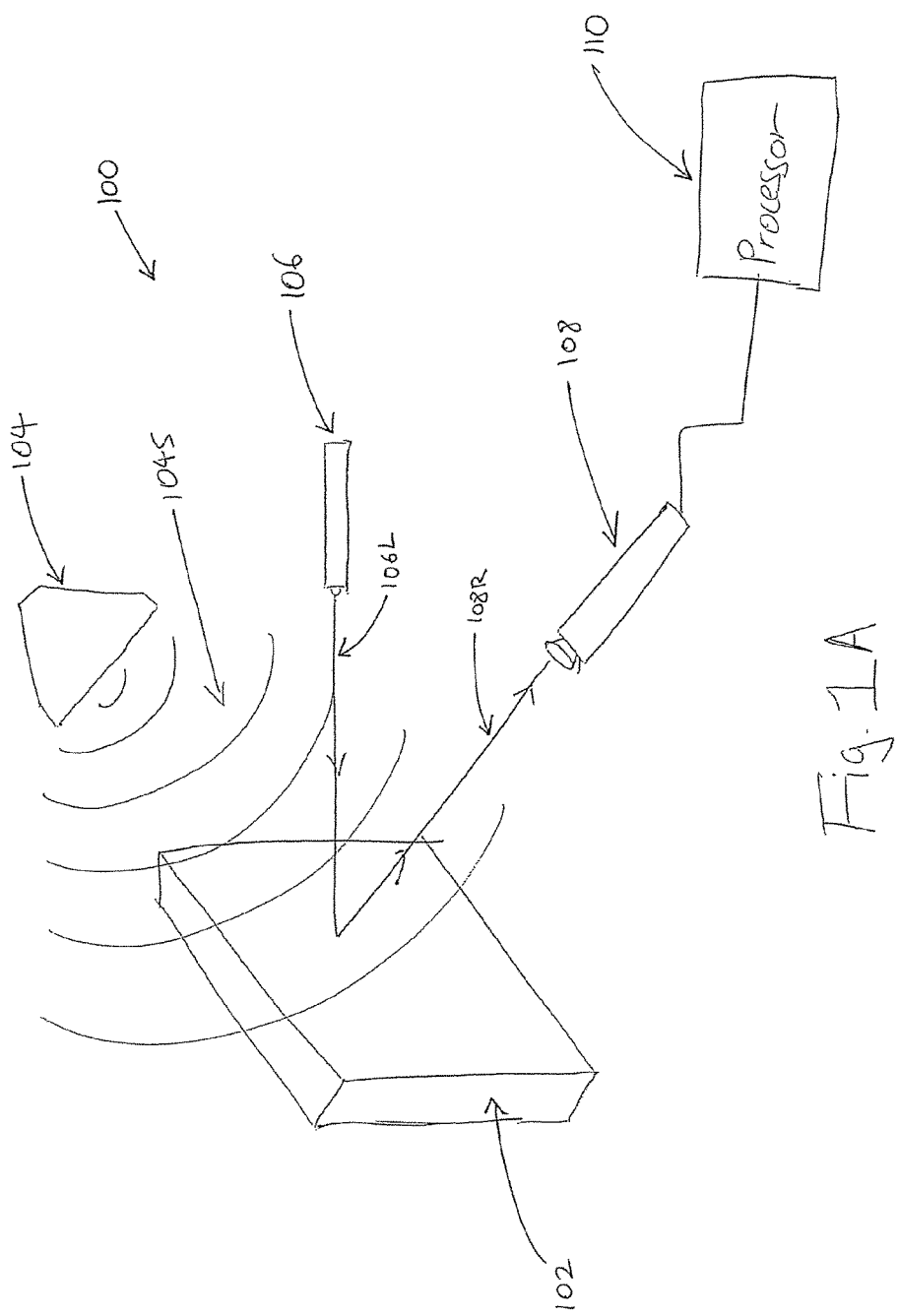

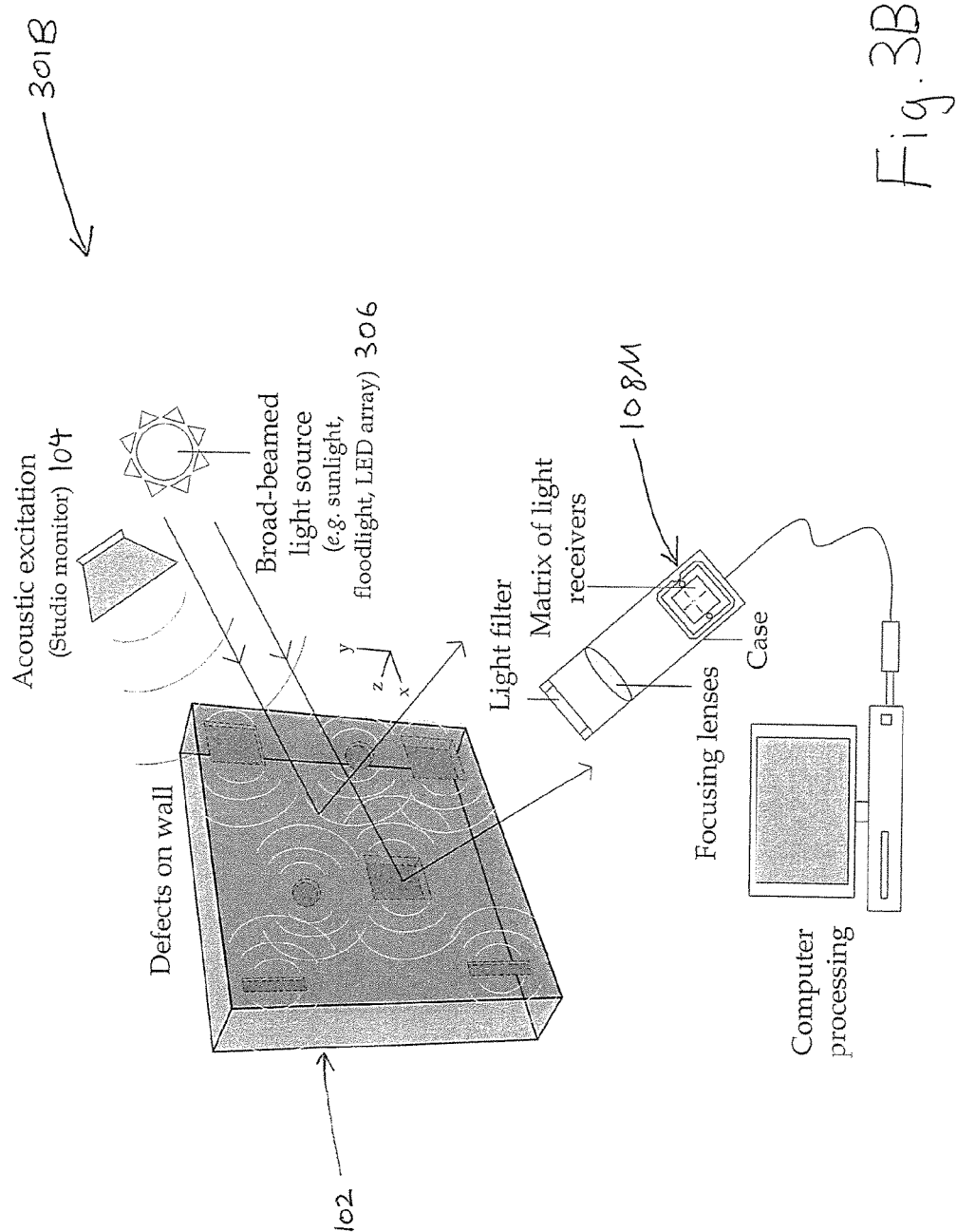

SYSTEM AND METHOD FOR DETECTING A DEFECT IN A STRUCTURE MEMBER

TECHNICAL FIELD

The present invention relates to a system and method for detecting a defect in a structure member, and particularly, although not exclusively, to a system and method for detecting defects with an optical signal.

BACKGROUND

Structure members used in the construction of buildings, aircraft, ships or any other machine or plant may have internal or interfacial defects which may not be obvious to the naked eye. In many instances, these defects may affect the strength or load tolerance of these structure members and thus it would be desirable to identify the presence of such defects in any structure member before it is put in use.

Although various methods exist to identify defects in any particular structure, these methods are inefficient or costly as time used to scan for defects is often a valuable resource in any construction or maintenance project. In addition to these difficulties, structure members that are already in use, including those that are already secured in a specific position, may not be readily removable or accessible for analysis.

SUMMARY OF THE INVENTION

In accordance with a first aspect of the present invention, there is provided a method for detecting a defect in a structure member comprising the steps of:
  exciting a structure member by applying an excitation signal to the structure member;
  applying an optical signal to the excited structure member and capturing a reflected optical signal formed by a reflection of the applied optical signal by the excited structure member; and
  processing the reflected optical signal to determine one or more defects in the structure member.

In an embodiment of the first aspect, the reflected optical signal is affected by characteristics of the structure member.

In an embodiment of the first aspect, the characteristics of the structure member include an excitation characteristic arranged to be affected by the excitation signal.

In an embodiment of the first aspect, the defect in the structure member is arranged to modify the excitation characteristic of the structure member.

In an embodiment of the first aspect, the excitation characteristic is arranged to affect the reflected optical signal.

In an embodiment of the first aspect, a defect of the structure member is arranged to modify the excitation characteristic of the structure member.

In an embodiment of the first aspect, the step of processing the reflected optical signal to determine one or more defects of the structure member includes comparing the reflected optical signal with a predetermined non-defect signal associated with a non-defect structure member.

In an embodiment of the first aspect, the predetermined non-defect signal is determined by exciting the non-defect structure member with the excitation signal; applying the optical signal to the excited non-defect structure member; and capturing the reflected optical signal formed by a reflection of the applied optical signal by the non-defect structure member.

In an embodiment of the first aspect, the step of processing the reflected optical signal further includes a step of applying a transformation function to the reflected optical signal.

In an embodiment of the first aspect, the transformation function is arranged to transform the reflected optical signal from time domain to a frequency domain.

In an embodiment of the first aspect, the transformation function is a Fast Fourier Transform (FFT) function.

In an embodiment of the first aspect, the step of capturing the reflected optical signal includes filtering the reflected optical signal.

In an embodiment of the first aspect, the step of filtering the reflected optical signal includes removing ambient light from the reflected optical signal.

In an embodiment of the first aspect, the optical signal is an amplified light signal.

In an embodiment of the first aspect, the optical signal is a broad-beamed light signal.

In some examples, broad-beamed light signals may include any light signals which may have a broad spectrum, including sunlights, incandescent lights, LED lights etc.

In an embodiment of the first aspect, the excitation signal is a white noise signal.

In accordance with a second aspect of the present invention, there is provided a system for detecting a defect in a structure member comprising:
  an excitation device arranged to excite a structure member by applying an excitation signal to the structure member;
  a light source arranged to apply an optical signal to the excited structure member;
  an optical receiver arranged to capture a reflected optical signal formed by a reflection of the applied optical signal by the excited structure member; and
  a processor arranged to process the reflected optical signal to determine one or more defects in the structure member.

In an embodiment of the second aspect, the reflected optical signal is affected by characteristics of the structure member.

In an embodiment of the second aspect, the characteristics of the structure member include an excitation characteristic arranged to be affected by the excitation signal.

In an embodiment of the second aspect, the defect in the structure member is arranged to modify the excitation characteristic of the structure member.

In an embodiment of the second aspect, the excitation characteristic is arranged to affect the reflected optical signal.

In an embodiment of the second aspect, the defect of the structure member is arranged to modify the excitation characteristic of the structure member.

In an embodiment of the second aspect, the processor is further arranged to compare the reflected optical signal with a predetermined non-defect signal associated with a non-defect structure member to determine the one or more defects in the structure member.

In an embodiment of the second aspect, the predetermined non-defect signal is determined by exciting the non-defect structure member with the excitation signal; applying the optical signal to the excited non-defect structure member; and capturing the reflected optical signal formed by a reflection of the applied optical signal by the non-defect structure member.

In an embodiment of the second aspect, the processor is further arranged to process the reflected optical signal with a transformation function to the reflected optical signal.

In an embodiment of the second aspect, the transformation function is arranged to transform the reflected optical signal from time domain to a frequency domain.

In an embodiment of the second aspect, the transformation function is a Fast Fourier Transform (FFT) function.

In an embodiment of the second aspect, the optical receiver includes a filter arranged to filter the reflected optical signal.

In an embodiment of the second aspect, the filter is arranged to remove ambient light from the reflected optical signal.

In an embodiment of the second aspect, the optical signal is an amplified light signal.

In an embodiment of the second aspect, the optical signal is a broad-beamed light signal.

In an embodiment of the second aspect, the excitation signal is a white noise signal.

In an embodiment of the second aspect, the light source includes a plurality of light emitting devices each arranged to illuminate a surface portion of the structure member.

In an embodiment of the second aspect, the optical receiver includes a plurality of light receivers each arranged to receive a reflected signal from each of the plurality of light emitting devices.

In an embodiment of the second aspect, each of the plurality of light receivers are associated with each of the plurality of light emitting devices.

In an embodiment of the second aspect of the present invention, the optical receiver includes a plurality of light receivers each arranged to receive a reflected signal from the structure member reflecting a broad beam light signal.

In an embodiment of the second aspect of the present invention, the broad beam light signal is emitted by a broad beam light source.

In an embodiment of the second aspect of the present invention, the processor is further arranged to process a variation of an intensity of the reflected optical signal.

In an embodiment of the second aspect of the present invention, the processor does not process the Doppler shift of the reflected optical signal.

BRIEF DESCRIPTION OF THE DRAWINGS

Embodiments of the present invention will now be described, by way of example, with reference to the accompanying drawings in which:

FIG. 1A is a block diagram showing a system for detecting a defect in a structure member in accordance with one embodiment of the present invention;

FIG. 3B is a diagram showing yet another embodiment of a system for detecting a defect in a structure member;

DETAILED DESCRIPTION OF THE PREFERRED EMBODIMENT

Figure 1B:
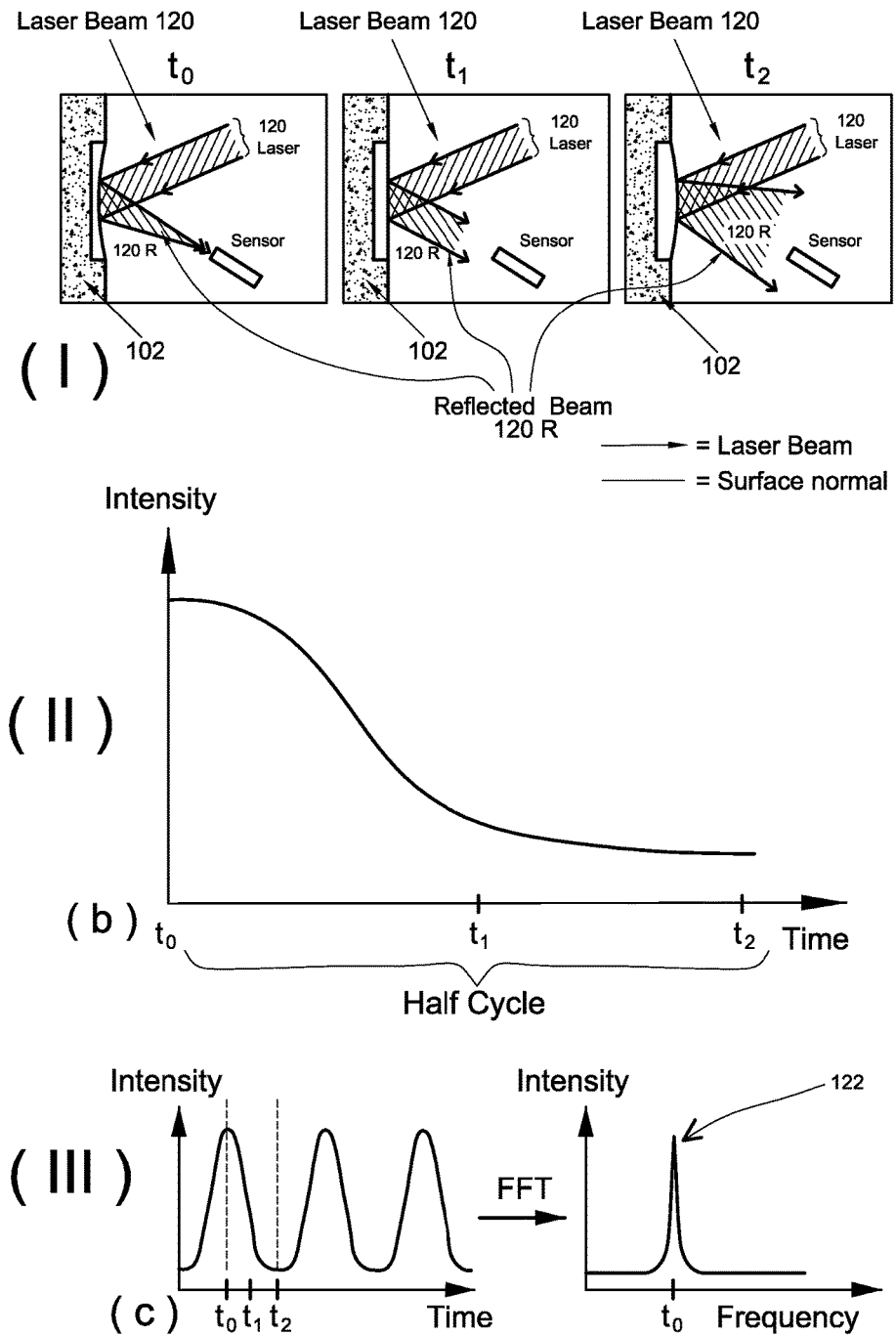
FIG. 1B is a series of graphical representations of the reflected optical signal.

Without wishing to be bound by theory, the inventors have, through their research, trial and experimentations discovered that if a structure, such as a structure member which may be a component, part or portion of a building, plant, machinery or vehicle, which is acoustically ideal in an open area is excited by white noise, the resulting vibration experienced by the structure would have equal energy at every frequency and thus would proceed to reproduce the incidental white noise.

However, in practice all objects have a set of resonance modes and therefore the frequency response of a structure undergoing excitation is not flat. Rather, spikes in the frequency response correspond to resonance frequencies of the object except for minor shifts due to effects such as damping.

The vibration of the surface results in the periodic variation of the surface normal. In turn, these periodic variations of the surface normal causes the reflected beam of light to converge and diverge at the same frequency as the vibration, resulting in an amplitude-modulated beam of reflection carrying information about the surface vibration. By capturing this reflected light either with a photodiode circuit or any other sources, the reflected light can be amplified and collected by a data logger as a voltage signal. This can in turn be analysed to determine if the vibration of the surface is of the characteristics of a structure member which has no defect or that the vibration of the surface normal would show that there is a defect therein.

Referring to FIG. 1A, there is provided a block diagram illustrating an embodiment of a system for detecting a defect in a structural member 100 comprising: an excitation device 104 arranged to excite a structure member 102 by applying an excitation signal 104S to the structure member 102; a light source 106 arranged to apply an optical signal 106L to the excited structure member 102; an optical receiver 108 arranged to capture a reflected optical signal 108R formed by a reflection of the applied optical signal 106L by the excited structure member 102; and a processor 110 arranged to process the reflected optical signal 106L to determine one or more defects in the structure member.

In this embodiment, the system 100 includes an excitation device 104 which is arranged to deliver excitation energy 104S in the form of a signal or pulse to a structure member 102 which is being analysed or checked for defects. In some examples, the excitation device 104 may be an audio speaker which can be controlled to deliver sound as a form of excitation energy 104S. Preferably, in these examples where an audio speaker is used as an excitation device 104, the audio speaker is controlled to deliver a white noise signal so as to excite the structure member 102 acoustically. It is understood that the term excitation device may not necessarily need to be a specific device, mechanism or arrangement as the excitation signals can take many forms. In some examples, the excitation device may also be a contact vibrator, a physical tapping mechanism, a device for providing EM induction, a device for providing a photo-acoustic effect, a piezoelectric mechanism all of which can create an excitation signal. Furthermore, environmental effects which create environmental noise coming from an environment or surroundings or vibrations generated by the measured object itself may also be a suitable excitation signal and thus the excitation source in some of these embodiments, being an environment effect or from within the object itself, would also be encapsulated in the term excitation device.

Once the structure member 102 is excited by the excitation device 104, a light source 106 is then arranged to deliver an optical signal 106L to the excited structure member 102. In this example, the optical signal 106L may be a light beam or signal such as a laser beam or a broad-beamed light signal such as sunlight or light from a light source as an LED. It is understood that examples of the optical signal 106L may include also electromagnetic waves or signals that are outside the visible spectrum, including, without limitation, Infar-red (IR) or Ultra Violet (UV) light. The light source 106 may be a directed and amplified light source arranged to deliver an amplified light signal such as a laser. Although other forms of light sources, including broad-beamed light sources such as a flood light, LED or even sunlight may be used in some embodiments. The optical signal 106L, once it reaches the surface of the structure member 102, may then be reflected from the surface of the structure member 102 as a reflected optical signal 108R and is in turn captured by an optical receiver 108 for processing by the processor 110 to determine if there are any defects in the structure member 102.

In one embodiment, the processor 110 is arranged to process the reflected signal 108R by comparing the reflected signal 108R with a predetermined reflected signal of a structure member which has no defect. In these instances, due to the vibration characteristic of the structure member 102, if there are any defects within the structure member 102, the vibration characteristics of the defected structure member should be different to that of the no defect structure member. Since the vibration characteristics would alter the reflected optical signal 108R, the processor 110 may, in some examples, be able to identify if the reflected optical signal 108R is of a defected structure member by comparing the captured optical signals with a predetermined sample set of a non-defect structure member.

Preferably, once the reflected optical signal 108R is captured by the optical receiver 108 and is transmitted to the processor 110 for processing. The optical receiver 108 may be connected through an interface to the bus of a computer system's processor 110 for processing the received reflected optical signal 108R. In one embodiment, the optical receiver 108 can be connected to a computer via an audio input such as a microphone input or USB input. In this embodiment, the received reflected optical signal 108R can then be inputted into the computer as an audio signal by the optical receiver 108 and in turn, this audio signal can then be processed by audio processing software.

The steps of processing the reflected optical signal 108R may also include transforming the reflected signal 108R from a time domain to a frequency domain with a transform method, such as, but not limited to, a Fast Fourier Transform (FFT) method. This in turn will create a modulated signal such that vibration modes of the structure member 102 can be identified by locating peaks in a plot of the signal on the frequency spectrum.

With reference to FIG. 1B, there is illustrated an example of the working principles of a system for detecting a defect in a structure member. As shown in FIG. 1B(I), when a light beam 120, such as those from a laser or any other optical source 106, is directed onto the surface of a sample structure member 102, the light beam is reflected off the surface of the sample structure member. However, when the structure member 102 is excited by an excitation signal, the surface of the structure member may vibrate such that the surface, or at least part thereof, will vibrate, such as in a concaved, normal and convex position relative to the unexcited state of the structure member, although other types of vibration modes are possible. This is illustrated in the t(0), t(1) and t(2) drawings of FIG. 1B(I).

As the surface may be concaved (t0), normal (t1) and convex (t2) due to the vibration of the structure member 102 from the excitation signal, the reflected signal 120R, as shown, would therefore alternate in intensity due to the combination (or lack of combination or the range in between) of the light signal when the signals are reflected. Thus the reflected signals, when captured and measured, would vary in intensity relative to time, as it is shown in FIG. 1B(II).

Once the values of intensity relative to time of the reflected light signal is obtained, the reflect light signal 120R is then processed with a transform method, such as FFT so as to transform the signal from a time domain to a frequency domain. In so doing, this transformed signal can then be used to identify specific frequency peaks 122 in the transformed signal as shown in FIG. 1B (III). These frequency peaks, or resonance may be predominantly governed by Kirchoff-Love plate theory. Thus as, an example, for a square clamped plate:

$$A = \frac{\lambda_{l,m} h}{\omega_{l,m}} \sqrt{\frac{E}{12\rho(1-v^2)}} \approx \frac{1.65h}{f_{1,1}} \sqrt{\frac{E}{\rho(1-v^2)}}$$

i.e. Fundamental mode $\propto 1/$Area of defect

As it is known that the resonance frequency (f) of the defect is inversely proportional to the defect's area (A) on a planar surface, by knowing the frequency of vibration, the system is able to estimate the area of the defect.

It is also known that the resonance frequency (f) of the defect is inversely proportional to the defect's depth (d) for a cubicle defect with the set of resonance modes (n) being linear, and thus can be decoupled from the resonance frequencies due to the defect's area to estimate the depth of the defect.

Some embodiments of the present invention are advantageous in that the nature of the reflected optical signal measured is very different when compared with Laser Doppler Vibrometry (LDV) systems. This is because some embodiments of the present invention analyses the reflected optical signal for intensity change and not the frequency or Doppler shift of the reflected optical signal. Thus the underlying physics of some embodiments of the present invention are very different from alternative systems like that of the LDV systems. Accordingly, in one aspect, as some embodiments of the present invention perform measurements of the reflected optical signal within the kHz range, the costs to implement embodiments of the present invention is lower than those of other systems which measure a signal in the MHz or even the GHz range.

Figure 2:
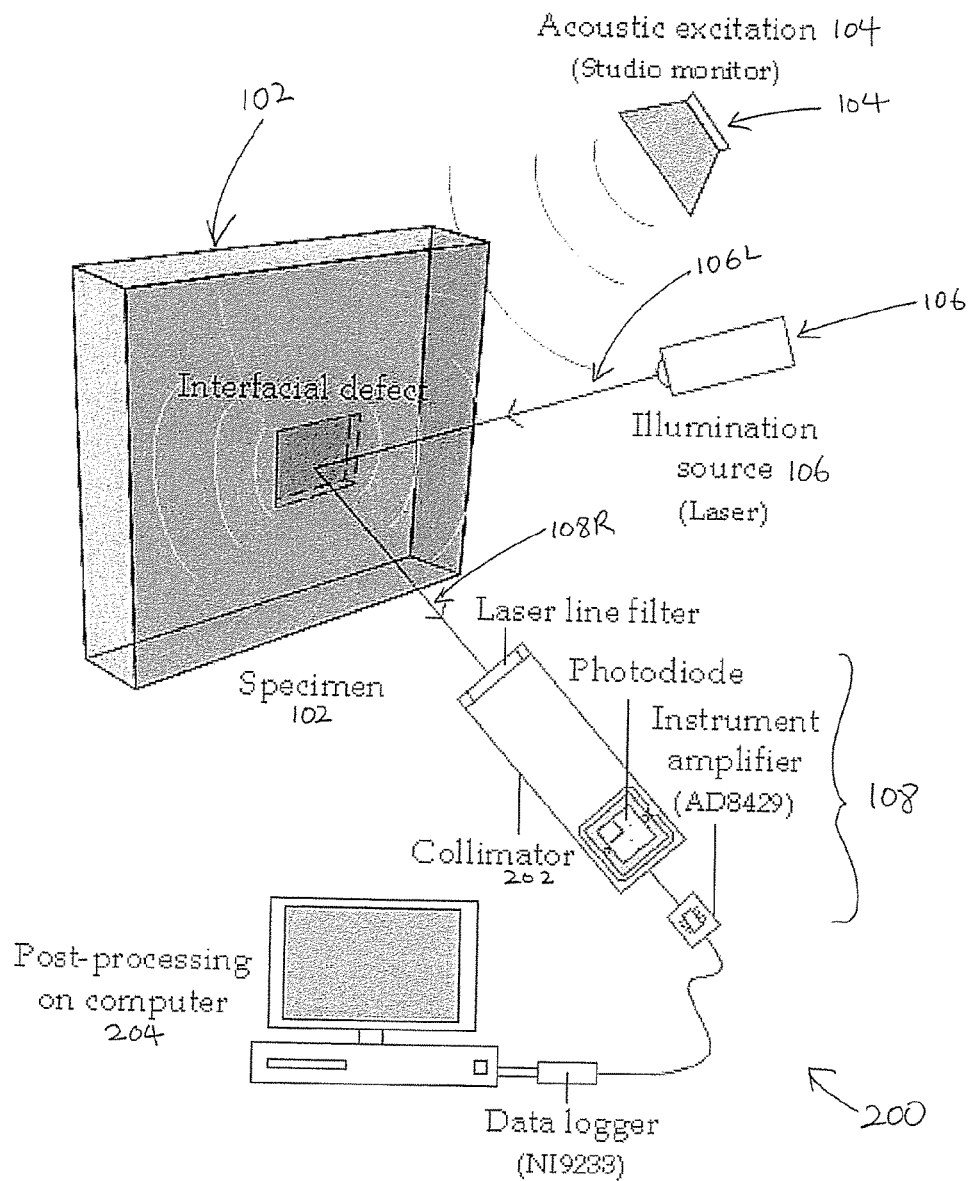
FIG. 2 is a diagram showing another embodiment of a system for detecting a defect in a structure member.

With reference to FIG. 2, there is illustrated an example embodiment of system for detecting defects 200 in a structure member 102 by use of a direct optical source such as a laser 106. In this embodiment, the laser 106 is arranged to be directed to a single point of the structure member 102 so as to detect for defects within the structure member 102 at a single point.

As shown in FIG. 2, in this example, the structure member 102, which may be a Fibre-reinforced Polymer (FRP) bonded concrete slab with artificially-induced interfacial defects is excited acoustically by white noise or any other suitable excitation signal from an acoustic excitation device 104 while a point on the surface of the structure member is illuminated 106L by a laser 106. It is to be noted that the excitation signal, apart from being a white noise, may also be a frequency sweep, ping or can be any other suitable excitation signal. In some examples, the excitation signal may have the characteristics of being generated with any linear combination of frequencies.

In this example embodiment, the specular reflection may be sufficiently strong and thus a lens system may not be needed for the light receiver 108. However, when the reflection is less strong, a lens system may assist in the capture of the reflected light signal. Preferably, a collimator 202 may be used to isolate low frequency noise in the reflected optical signal 108R due to ambient light.

As shown earlier in FIG. 1B(I), in this example embodiment, the surface of the FRP portrays the role of a flexible mirror by alternately focusing and diverging the reflected light 108R. In turn, this encodes information about surface mechanical vibration of the excited structure member 102 into amplitude-modulated (AM) light signal. This signal, when reflected, is captured by a light detector 108, which may be implemented, in one example, as a photodiode.

Once the reflected signal 108R is captured, the amplitude modulation of irradiance is converted into frequency domain in post-processing 204. As such, if an interfacial defect exists beneath the surface of the structure member 102, the surface will exhibit a frequency response different from an intact or non-defect structure member surface. By analysing the frequency response, the dimensions of the defect and the damage extent can be inferred from the frequency spectrum obtained.

Figure 3:
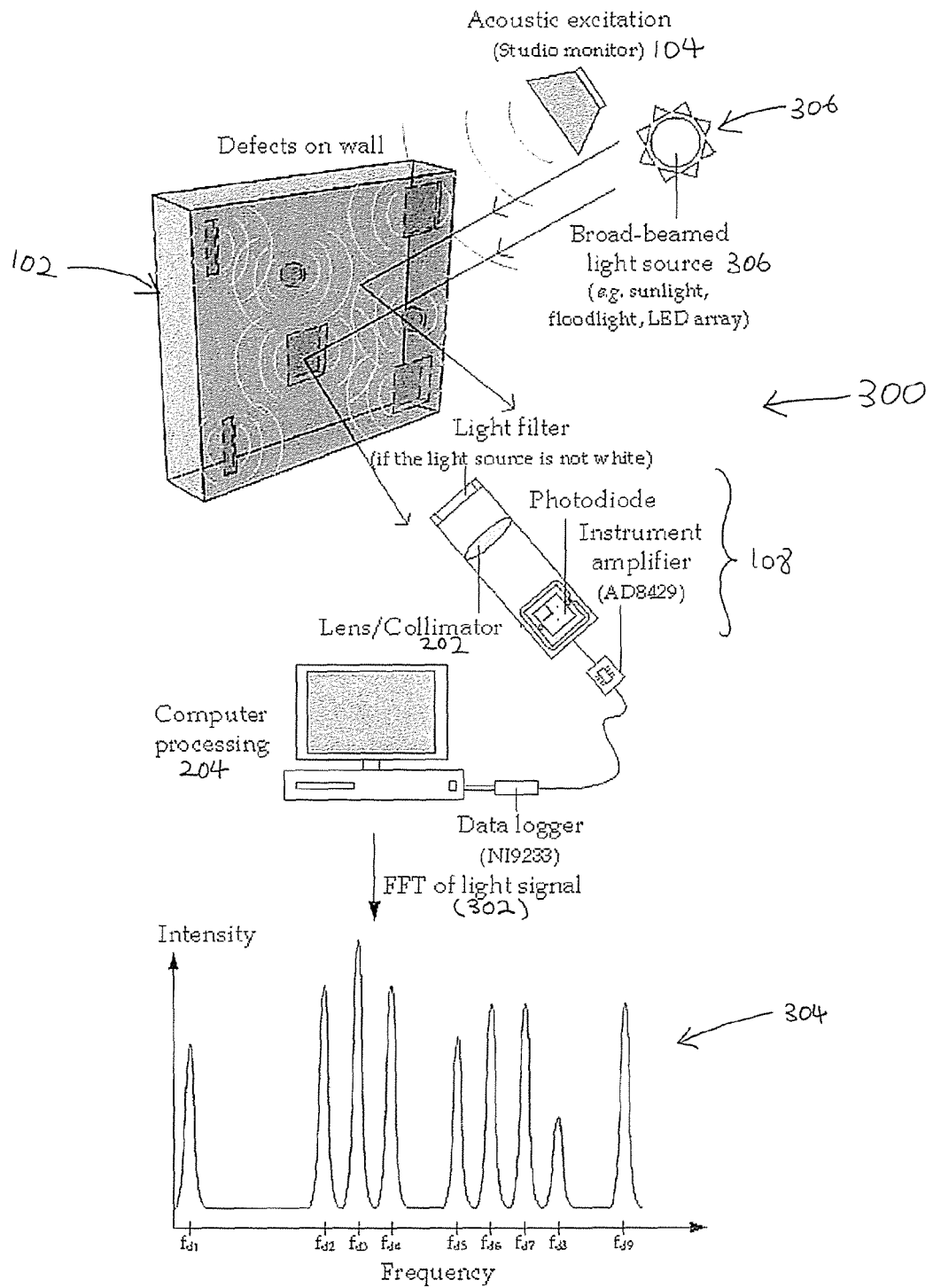
FIG. 3 is a diagram showing another embodiment of a system for detecting a defect in a structure member.

With reference to FIG. 3, there is illustrated another embodiment of the system for detecting a defect in a structure member 300. In this embodiment, a broad-beamed light source 306, such as sunlight, flood lights, LED array or any other light source may be used to generate and direct an optical beam to the structure member 102. As the light source is a broad-beamed light source, this example embodiment of the present invention is arranged to simultaneously detect multiple defects over a large area.

In this example embodiment, the optical receiver 108 may be a light sensor array arranged to obtain an image of vibration activity over the entire area of the excited (104) structure member 102 under inspection. As such, multiple vibration signatures associated with multiple defects may be captured simultaneously.

Once the reflected signals are captured, the signal is further processed 204 by a transform method 302 to transform the signal from time domain into frequency domain such that multiple peaks 304, if any, may be observed. These frequency peaks 304 reflect the vibration signatures of parts of the structure member being analysed and can then be compared with the vibration signatures of a non-defect structure member so as to identify whether there are any defects on the structure member 102.

Figure 3A:
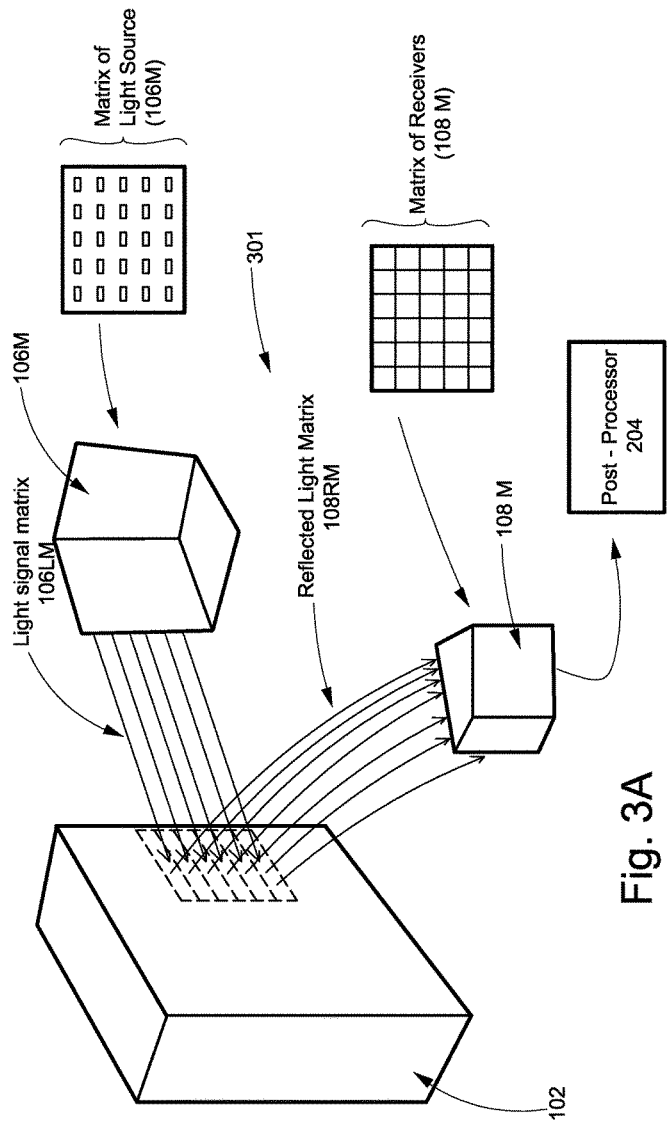
FIG. 3A is a diagram showing another embodiment of a system for detecting a defect in a structure member.

With reference to FIG. 3A, there is illustrated another alternative embodiment of system for detecting a defect in a structure member 301. In this embodiment, the optical source 106 as shown in FIG. 2 may be replaced with multiple optical sources 106M such as an LED or laser array or matrix arranged to direct multiple light signals 106LM to the surface of a structure member 102. In turn, multiple light receivers 108M may be arranged to receive the multiple reflected light signals 108RM reflected off the structure member 102. In this way, each of the multiple optical sources (e.g. each LED or laser or any individual light source within the array or matrix) may have a corresponding light receiver arranged to receive the reflected light of a particular optical source.

Once each of the light receivers of the multiple light receivers 108M receives the reflected signal 108RM of a particular optical source, each reflected signal may then be processed 204 as per the post-processing examples described above with reference to FIGS. 2 and 3. In this example, by having multiple optical sources 106M and light receivers 108M, an accurate analysis of a surface area of the structure member 102 can be conducted very quickly. Thus if the multiple optical sources and light receivers are arranged in an array or, as shown in FIG. 3A, in the form of a 2D matrix, a row or 2D surface area can be analysed simultaneously and thus increasing the speed of analysing a large surface area.

In another example embodiment, the multiple optical sources 106M may each individually, combination of, or in its entirety have a distinct spectrum to distinguish among the sources by the light receivers.

In yet another example embodiment of the system for detecting a defect, the system may be implemented with multiple optical sources such as an LED or laser array or matrix as shown in FIG. 3A and a single light receiver 108 as shown in FIG. 2. In this example embodiment, the multiple optical sources may illuminate an entire surface or a portion of a structure member 102 whilst allowing the reflected signal to be received by the single light receiver 108. As is the case in the other embodiments described above, the received light signal can then be processed to identify specific defects.

In this example, if any defects can be detected, a single point analysis as described in one embodiment as shown in FIG. 2 may then be undertaken to identify the exact location of the defect. This embodiment may be advantageous in that multiple points of analysis can be undertaken simultaneously and thus increasing the efficiency of the detection of defects within a particular structure member. Moreover, the cost of only using a single light receiver is also greatly reduced as the system can be substantially simplified.

With reference to FIG. 3B, there is illustrated another embodiment of the system for detecting a defect in a structure member 301B. In this embodiment, the system 301B is implemented with a multiple light receiver 108M similar to the multiple light receivers 108M as shown in FIG. 3A, but instead, the receiving reflected light signals from the structure member was originally sourced from a broad beam light source 306 such as sunlight, flood light or LED. In this sense, there is no association between an individual light source and each of the light receivers found in the multiple light receivers 108M. This embodiment is also advantageous in that a large surface area of the structure member can be analysed quickly relative to using a single reflected light receiver.

It should be noted that the term "optical signal" or any signal from an "optical source" may include any light signal such as visible light as described with reference to FIGS. 1 to 3A. It should also be noted that the term "light signal" as used herein will include any wave in the electro-magnetic spectrum including, but not limited to, infrared or X-rays or any other wave signal which provides that the vibration of the surface of the structure member 108 can modulate the intensity of the signal directed at the surface of the structure member 108. Accordingly, the term "optical source" may include any source which can emit or provide any such signal.

Figure 4:
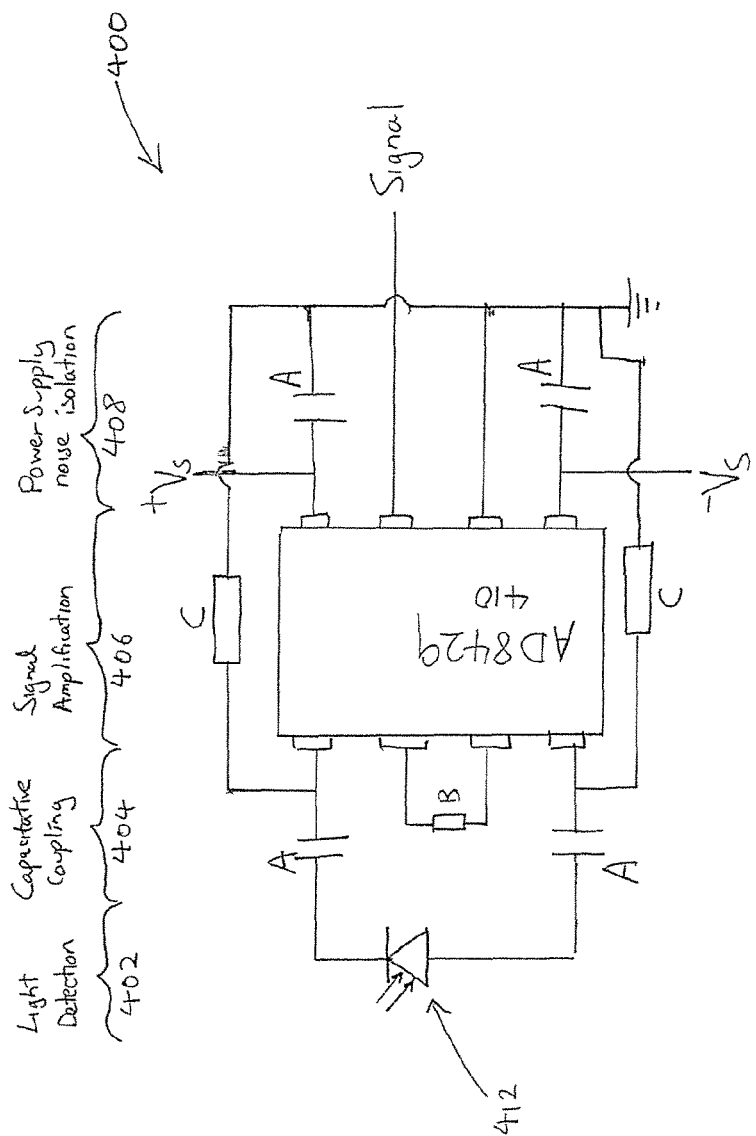
FIG. 4 is a wiring diagram of an example of an optical receiver for the system of FIG. 1.

With reference to FIG. 4, there is provided a basic wiring diagram of an optical receiver 400 arranged to receive a reflected optical signal from a structure member being analysed. As shown in this example, the receiver 400 includes a light detection portion 402, a capacitative coupling 404, a signal amplification circuit 406 and a power supply noise isolation function 408 so as to receive and amplifier the reflected optical signal for further processing.

In this example embodiment, the light detection portion 402 includes a photodiode 412 to receive the reflected optical signal from the excited structure member. Once received, the signal is transmitted to a signal amplifier circuit via a capacitative coupling 404. The amplifier circuit 406 includes an amplifier 410, such as the AD8429 low noise amplifier 410 can be used to amplify the signal from a light sensitive photo-diode 412 used to receive the reflected optical signal. A noise isolation function 408 may also be provided such that noise caused by low light or ambient light may be removed from the signal before it is processed. A resistor may also be used in electrical communication with the capacitive coupling between the photodiode and the amplifier to prevent charge build up in the capacitive coupling.

Figure 5:
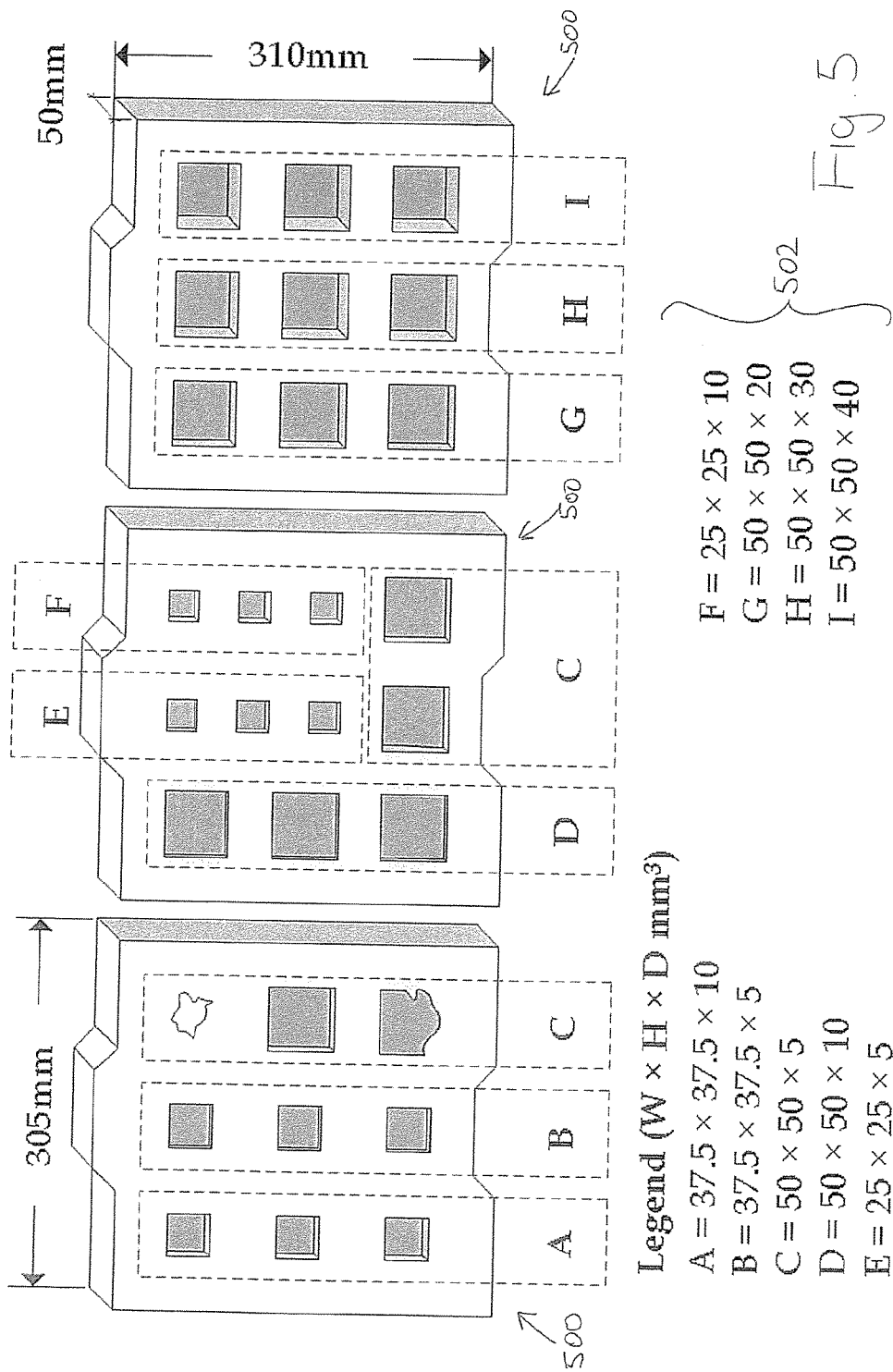
FIG. 5 is an illustration of specimens of structure members analysed by an embodiment of the system for detecting a defect in a structure member.

With reference to FIGS. 5 to 8, there is illustrated an experimental process and example results in which specimens of structure members 500 are analysed by an embodiment of a system for detecting defects 600. In this embodiment, specimens of structure members 500, such as those shown in FIG. 5, are arranged to have a plurality of defects of specific dimensions 502 A to I as shown in FIG. 5.

A=37.5×37.5×10
B=37.5×37.5×5
C=50×50×5
D=50×50×10
E=25×25×5
F=25×25×10
G=50×50×20
H=50×50×30
I=50×50×40

Figure 6:
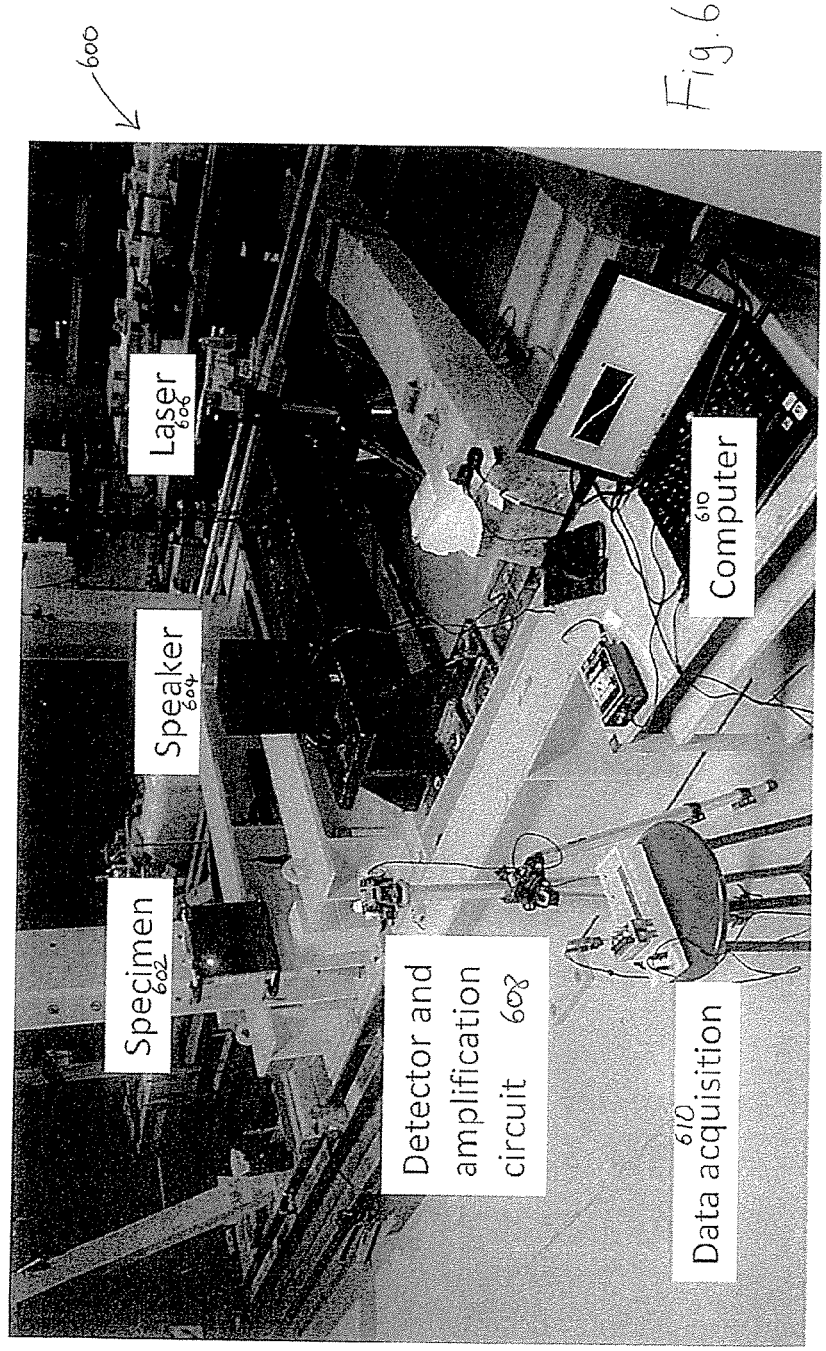
FIG. 6 is a photograph of a system for detecting a defect in a structure member.

The specimen structure members 500/(602 as shown in FIG. 6) are then analysed in accordance with a system as arranged in FIG. 6 which, as shown, has a speaker 604 as an excitation device, a laser 606 as an optical source, a detector and amplification circuit 608 as an optical receiver and a computer with data acquisition circuit 610 as the processor for processing the captured reflected optical signal.

The procedure in which the system is operated to detect defects in the specimen includes the following:

1. Point a laser 606 (e.g. 532 nm laser) at the specimen 602;
2. Put the speaker 604 in front the specimen 602;
3. Place the light detector 608 in the path of the laser's reflection from the specimen 602 (for maximum signal-to-noise ratio);
4. Start data acquisition 610 (of reflected light intensity). If this step is done without excitation, then the data acquired can be used as a noise print for later noise removal; and
5. Play acoustic excitation (white noise at 102 dB(SPL)) and repeat the process to obtain data results.

Figure 7A:
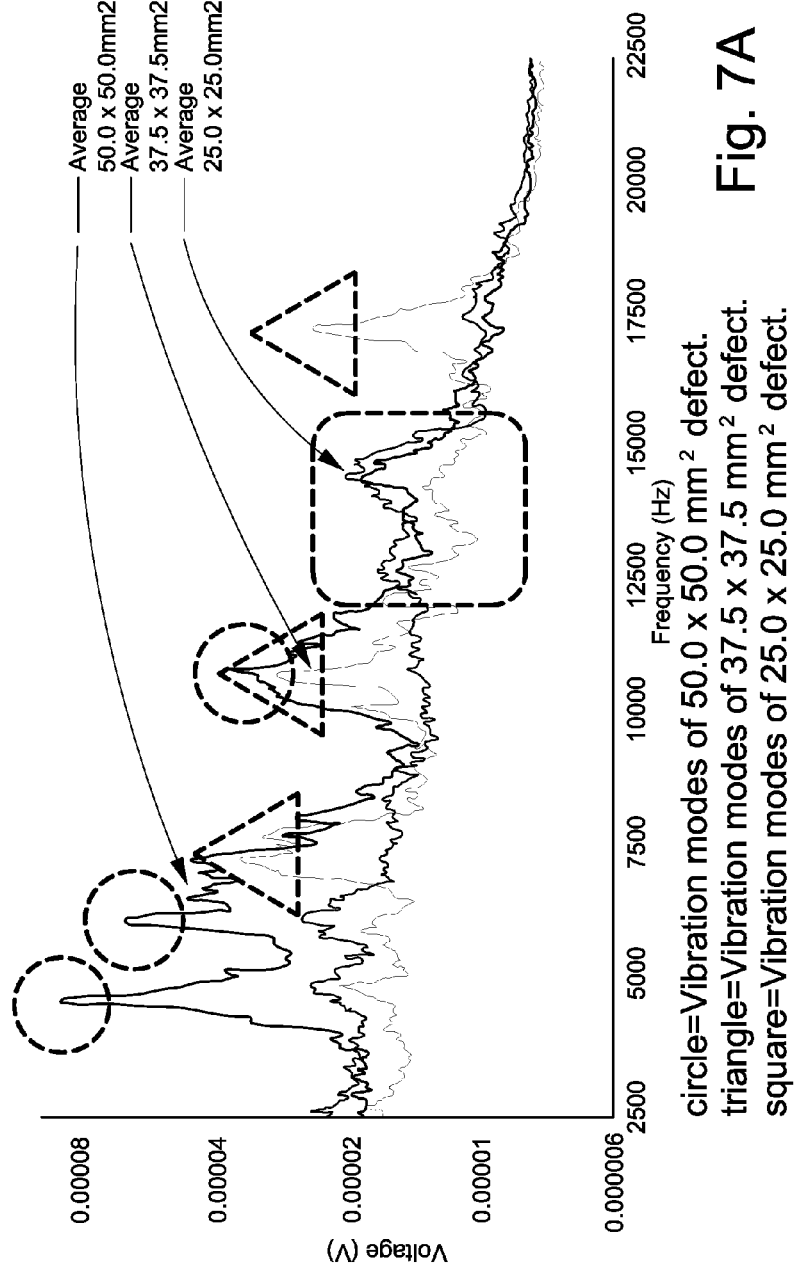
FIG. 7A is a graph representative of the reflected optical signal captured by the system of FIG. 6 when using a laser as an optical source.

With reference to FIG. 7A, there is illustrated a graphical plot of the reflected optical signal after it has been processed with a FFT transform method to transform the signal from a time domain to a frequency domain. The graphical plot shows specific peaks which are associated with a specific defect. These include:

Circled Peaks are the vibration modes of the 50×50 mm2 defect;
Triangle Peaks are the vibration modes of the 37.5×37.5 mm2 defect; and
Square Peaks are the vibration modes of the 25×25 mm2 defect.

Figure 7B:
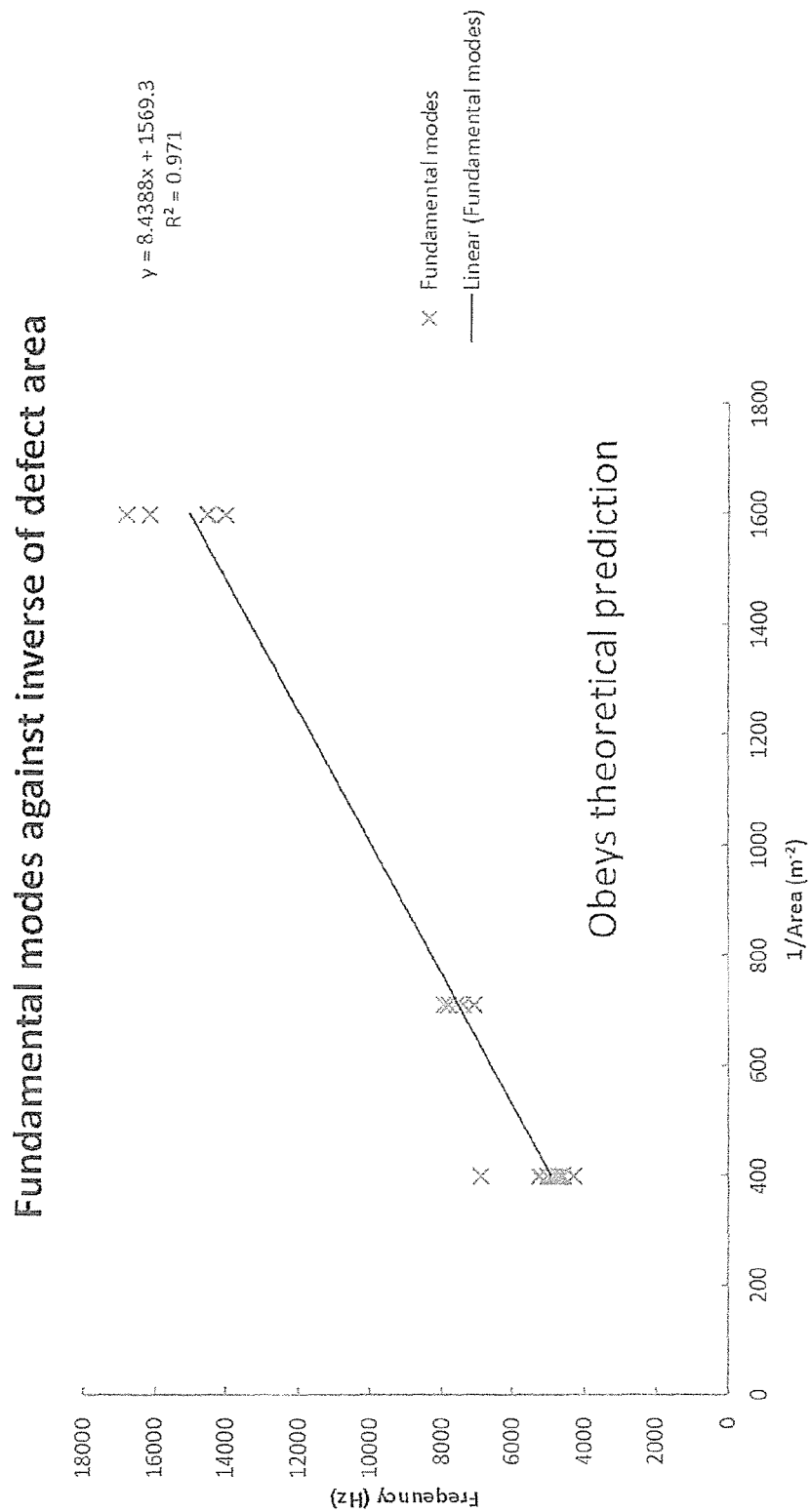
FIG. 7B is a graphical plot of the reflected optical signal of FIG. 7A against an associated specimen defect area; and, FIG. 8 is a graph representative of the reflected optical signal captured by the system of FIG. 6 when using a scattered light source as an optical source.

According to the trends which can be observed from these results, it can be observed that:

The bigger defect, the frequency of the reflected optical signal will have a low frequency but will have a larger amplitude; and
As shown in FIG. 7B, the frequency of the fundamental mode of vibration obeys the scaling law with the defect area (see equation 1, Kirchoff-Love plate theory for a square clamped plate).

Figure 8:
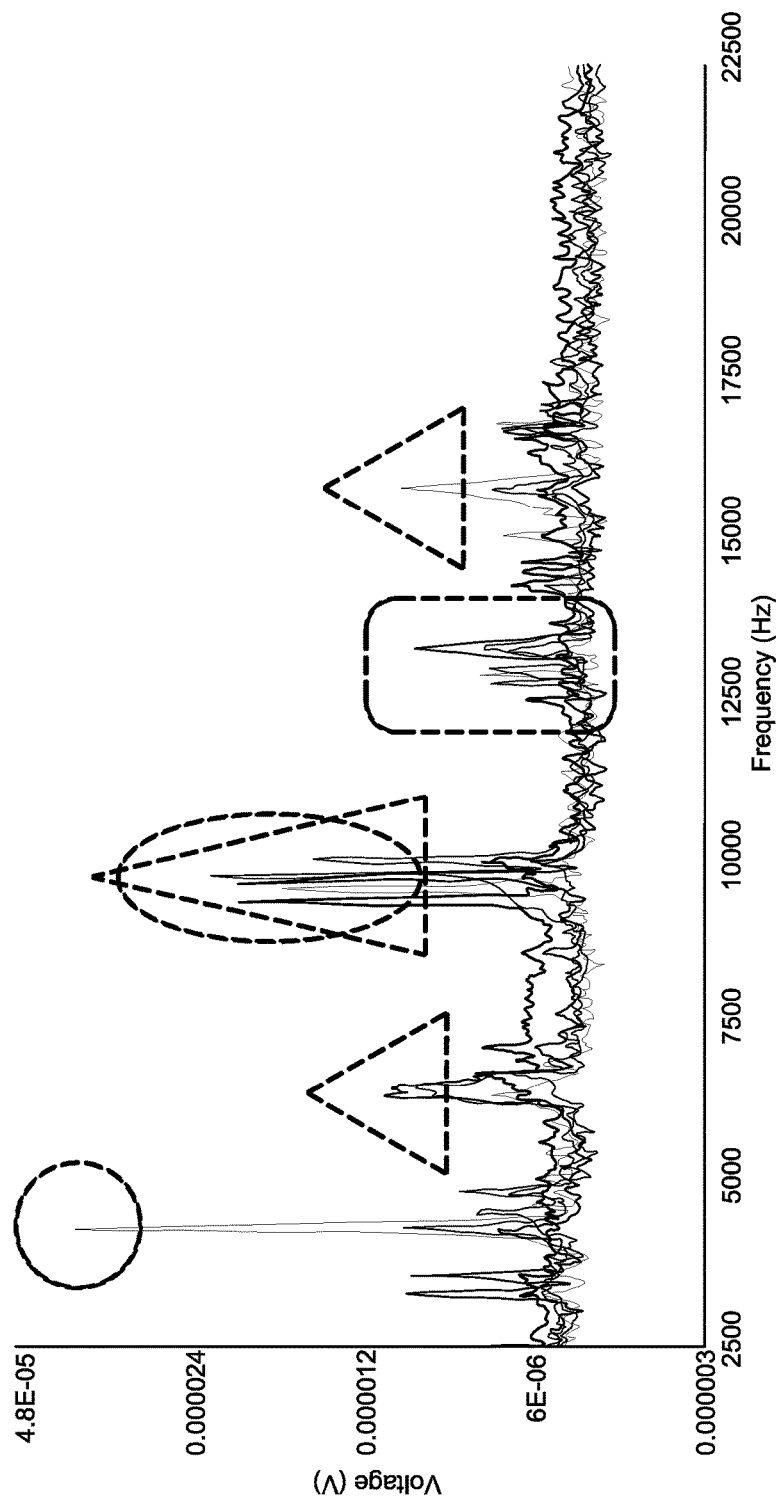

With reference to FIG. 8, there is shown a plot of the transformed reflected optical signal when sunlight is used as an optical light source. In this embodiment, the excitation signal is again a white noise at different levels of loudness, including:

XL=103 dB(SPL)
L=100 dB(SPL)
M=95 dB(SPL)
S=90 dB(SPL)

In this example, the result is that different vibration modes from different defects are superimposed on to each other. Nonetheless, frequency peaks which can be identified as shown in FIG. 8, also shows the defect areas with Circled Peaks are the vibration modes of the 50×50 mm2 defect;
Triangle Peaks are the vibration modes of the 37.5×37.5 mm2 defect; and
Rectangular/Square Peaks are the vibration modes of the 25×25 mm2 defect.

Embodiments of the present invention may be advantageous in that the system is able to analyse a structure member without making contact with the structure member. This would mean that the system is able to analyse a structure member even if the structure member is in a difficult to access location. Furthermore, as the surface being analysed may not be mass-loaded, the accuracy of the analysis is not compromised due to any physical contact.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for detecting a defect in a structure member comprising the steps of:
    exciting a structure member by applying an excitation signal to the structure member, wherein the excitation signal includes an acoustic excitation;
    applying an optical signal to the excited structure member and capturing a reflected optical signal formed by a reflection of the applied optical signal by the excited structure member, wherein the reflected optical signal includes an amplitude-modulated optical signal; and
    processing the reflected optical signal to determine one or more defects in the structure member.

2. A method in accordance with claim 1, wherein the step of processing the reflected optical signal to determine one or more defects of the structure member includes comparing the reflected optical signal with a predetermined non-defect signal associated with a non-defect structure member.

3. A method in accordance with claim 2, wherein the predetermined non-defect signal is determined by exciting the non-defect structure member with the excitation signal; applying the optical signal to the excited non-defect structure member; and capturing the reflected optical signal formed by a reflection of the applied optical signal by the non-defect structure member.

4. A method in accordance with claim 1, wherein the step of processing the reflected optical signal further includes a step of applying a transformation function to the reflected optical signal.

5. A method in accordance with claim 4, wherein the transformation function is arranged to transform the reflected optical signal from time domain to a frequency domain.

6. A method in accordance with claim 5, wherein the transformation function is a Fast Fourier Transform (FFT) function.

7. A method in accordance with claim 1, wherein the step of capturing the reflected optical signal includes filtering the reflected optical signal.

8. A method in accordance with claim 7, wherein the step of filtering the reflected optical signal includes removing ambient light from the reflected optical signal.

9. A method in accordance with claim 1, wherein the optical signal is an amplified light signal.

10. A method in accordance with claim 1, wherein the optical signal is a broad-beamed light signal.

11. A method in accordance with claim 1, wherein the excitation signal is a white noise signal.

12. A system for detecting a defect in a structure member comprising:
    an excitation device arranged to excite a structure member by applying an excitation signal to the structure member, wherein the excitation signal includes an acoustic excitation;
    a light source arranged to apply an optical signal to the excited structure member;
    an optical receiver arranged to capture a reflected optical signal formed by a reflection of the applied optical signal by the excited structure member, wherein the reflected optical signal includes an amplitude-modulated optical signal; and
    a processor arranged to process the reflected optical signal to determine one or more defects in the structure member.

13. A system in accordance with claim 12, wherein the processor is further arranged to process the reflected optical signal with a transformation function to the reflected optical signal.

14. A system in accordance with claim 13, wherein the transformation function is arranged to transform the reflected optical signal from time domain to a frequency domain.

15. A system in accordance with claim 14, wherein the transformation function is a Fast Fourier Transform (FFT) function.

16. A system in accordance with claim 15, wherein the optical receiver includes a filter arranged to filter the reflected optical signal.

17. A system in accordance with claim 16, wherein the filter is arranged to remove ambient light from the reflected optical signal.

18. A system in accordance with claim 12, wherein the optical signal is an amplified light signal.

19. A system in accordance with claim 12, wherein the optical signal is a broad-beamed light signal.

20. A system in accordance with claim 12, wherein the excitation signal is a white noise signal.

21. A system in accordance with claim 12, wherein the optical receiver includes a plurality of light receivers each arranged to receive a reflected signal from the structure member reflecting a broad beam light signal.

22. A system in accordance with claim 21, wherein the broad beam light signal is emitted by a broad beam light source.

23. A system in accordance with claim 12, wherein the light source includes a plurality of light emitting devices each arranged to illuminate a surface portion of the structure member.

24. A system in accordance with claim 23, wherein the optical receiver includes a plurality of light receivers each arranged to receive a reflected signal from each of the plurality of light emitting devices.

25. A system in accordance with claim 24, wherein each of the plurality of light receivers are associated with each of the plurality of light emitting devices.

26. A system in accordance with claim 12, wherein the processor is further arranged to process a variation of an intensity of the reflected optical signal.

27. A system in accordance with claim 12, wherein the processor does not process the Doppler shift of the reflected optical signal.

* * * * *